US011922863B1

United States Patent

(12) United States Patent
Tung et al.

(10) Patent No.: US 11,922,863 B1
(45) Date of Patent: Mar. 5, 2024

(54) DISPLAY PANEL AND PIXEL CIRCUIT THEREOF

(71) Applicant: AUO Corporation, Hsinchu (TW)

(72) Inventors: Che-Wei Tung, Hsinchu (TW); Mei-Yi Li, Hsinchu (TW); Che-Chia Chang, Hsinchu (TW); Yu-Chieh Kuo, Hsinchu (TW); Yu-Zuo Lin, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/086,688

(22) Filed: Dec. 22, 2022

(30) Foreign Application Priority Data

Nov. 9, 2022 (TW) ................................ 111142870

(51) Int. Cl.
*G09G 3/32* (2016.01)

(52) U.S. Cl.
CPC ....... *G09G 3/32* (2013.01); *G09G 2300/0842* (2013.01); *G09G 2320/0233* (2013.01)

(58) Field of Classification Search
CPC ............. G09G 3/32; G09G 2300/0842; G09G 2320/0233
See application file for complete search history.

(56) References Cited

U.S. PATENT DOCUMENTS

2018/0323180 A1* 11/2018 Cok .................... H01L 23/5386
2021/0051781 A1* 2/2021 Song ...................... H05B 45/44
2021/0065614 A1* 3/2021 Kim ......................... G09G 3/32
2021/0366345 A1* 11/2021 Tseng ................... G09G 3/2007
2022/0044643 A1* 2/2022 Gu ........................... G09G 3/32

FOREIGN PATENT DOCUMENTS

CN 104916255 9/2015
TW I695363 6/2020

* cited by examiner

*Primary Examiner* — Andrew Sasinowski
(74) *Attorney, Agent, or Firm* — JCIPRNET

(57) ABSTRACT

A display panel and a pixel circuit thereof are provided. The pixel circuit includes a driving current generator, a pulse width signal generator, a voltage provider, and a current enabler. The driving current generator provides a driving current. The pulse width signal generator includes an output switch. The output switch is controlled by a control signal, and provides a pulse width signal according to the control signal. The voltage provider adjusts the control signal according to a data write-in signal and a pulse width modulation enable signal. The current enabler provides the driving current to a lighting component according to the pulse width signal and an amplitude modulation enable signal.

13 Claims, 6 Drawing Sheets

100

DISPLAY PANEL AND PIXEL CIRCUIT THEREOF

CROSS-REFERENCE TO RELATED APPLICATION

This application claims the priority benefit of Taiwan application serial no. 111142870, filed on Nov. 9, 2022. The entirety of the above-mentioned patent application is hereby incorporated by reference herein and made a part of this specification.

BACKGROUND

Technical Field

The disclosure relates to a display panel and a pixel circuit thereof, and more particularly, to a display panel that improves display uniformity and a pixel circuit thereof.

Description of Related Art

In today's technical field, pixel circuits may adjust the luminance of a lighting component through pulse width modulation technology and pulse amplitude modulation technology. The pulse amplitude modulation technology is used to adjust the size of a driving current, and the pulse width modulation technology is used to adjust an action time of the driving current. Under low grayscale display conditions, the pixel circuit may reduce the luminance of the lighting component by reducing the action time of the driving current. However, with the variation of the threshold voltage of the transistor in the pixel circuit, the pulse width signal used by the pixel circuit to control the action time of the driving current may not be able to provide a large enough width, so that the luminance produced by the lighting component may be insufficient. In the display panel, multiple pixel circuits may cause uneven luminance on the display due to the difference in the threshold voltage of the transistor, seriously affecting the display quality.

SUMMARY

The disclosure provides a display panel and a pixel circuit thereof, which maintains the luminance uniformity of a display screen under low grayscale display conditions.

The pixel circuit of the disclosure includes a driving current generator, a pulse width signal generator, a voltage provider, and a current enabler. The driving current generator provides a driving current. The pulse width signal generator includes an output switch. The output switch is controlled by a control signal, and provides a pulse width signal according to the control signal. The voltage provider is coupled to a control end of the output switch, and adjusts the control signal according to a data write-in signal and a pulse width modulation enable signal. The current enabler is coupled to the driving current generator and the pulse width signal generator, and provides the driving current to a lighting component according to the pulse width signal and an amplitude modulation enable signal.

The display panel of the disclosure includes multiple pixel circuits as described above. The pixel circuits are arranged into a display array.

Based on the above, the disclosure disposes the voltage provider in the pixel circuit. The voltage provider lowers the control signal according to the data write-in signal and the pulse width modulation enable signal, so as to accelerate the turn-on speed of the output switch. In this way, under low grayscale display conditions, the pulse width signal generator provides the pulse width signal to the current enabler quickly, as well as the driving current to the lighting component immediately. It may effectively improve the uniformity of luminance of the display under low grayscale display conditions.

DESCRIPTION OF THE EMBODIMENTS

Figure 1:
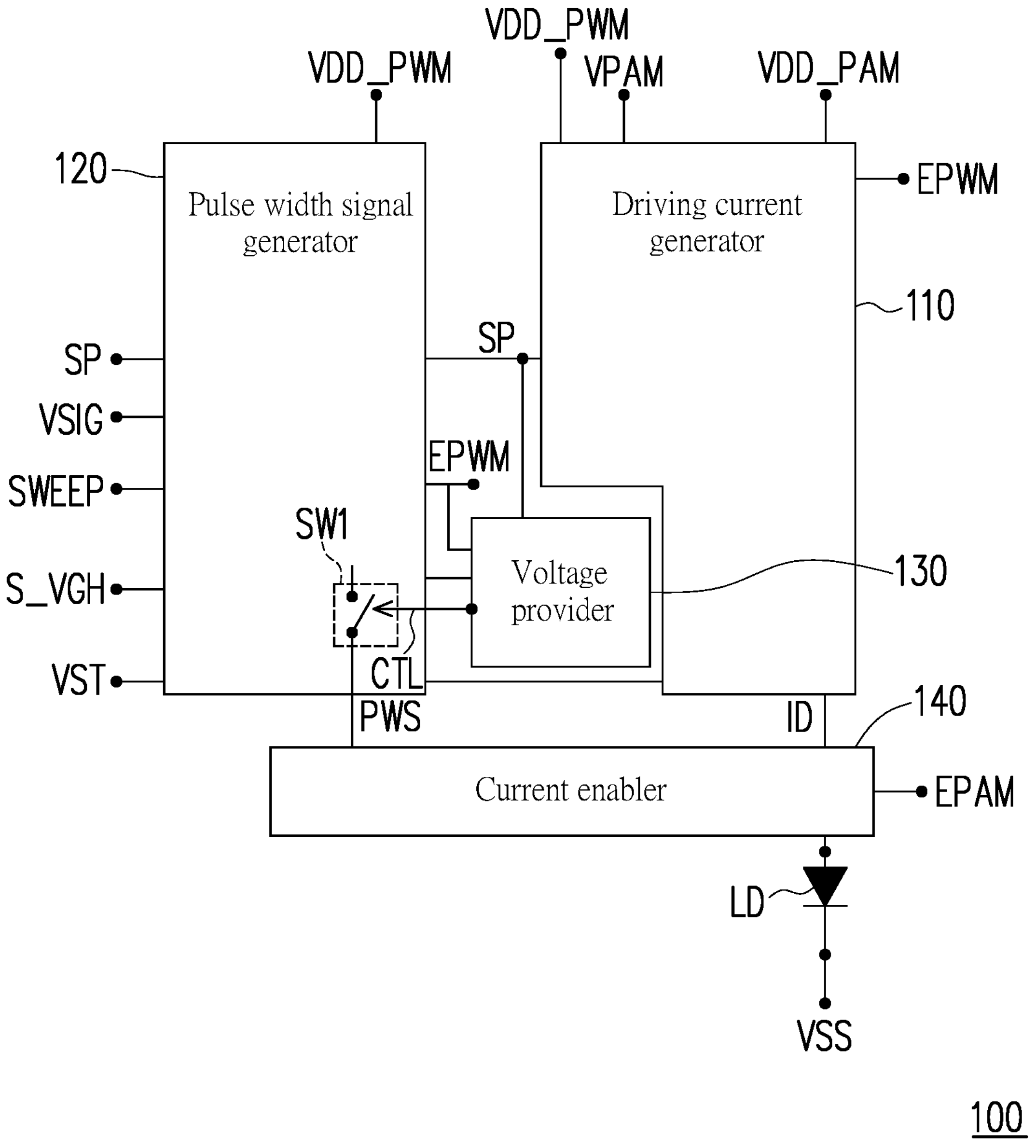
FIG. 1 is a schematic diagram of a pixel circuit according to an embodiment of the disclosure.

FIG. 1 is a schematic diagram of a pixel circuit according to an embodiment of the disclosure. Referring to FIG. 1, a pixel circuit 100 includes a driving current generator 110, a pulse width signal generator 120, a voltage provider 130, and a current enabler 140. The driving current generator 110 is configured to provide a driving current ID to the current enabler 140. The driving current generator 110 operates based on an operation voltage VDD_PAM and an operation voltage VDD_PWM. The driving current generator 110 generates and adjusts a current value of the driving current ID according to a data write-in signal SP, write-in display data VPAM, and a pulse width modulation enable signal EPWM.

The pulse width signal generator 120 is coupled to the driving current generator 110, the voltage provider 130, and the current enabler 140. An output end of the pulse width signal generator 120 includes an output switch SW1. The output switch SW1 is controlled by a control signal CTL to be turned on or off. In response to the output switch SW1 being turned on according to the control signal CTL, the pulse width signal generator 120 provides the pulse width signal PWS to the current enabler 140 through the output switch SW1.

In this embodiment, the pulse width signal generator 120 operates based on the operation voltage VDD_PWM and generates the pulse width signal PWS according to the data write-in signal SP, a sweeping signal SWEEP, a reference voltage S_VGH, a reset signal VST, and write-in display data VSIG.

On the other hand, the voltage provider 130 is coupled to a control end of the output switch SW1. The voltage provider 130 may adjust a voltage value of the control signal CTL according to the data write-in signal SP and the pulse width modulation enable signal EPWM. In this embodiment, the voltage provider 130 accelerates the turn-on speed of the output switch SW1 by adjusting the voltage value of the control signal CTL.

The current enabler 140 is further coupled to a lighting component LD. The current enabler 140 provides the driving current ID to the lighting component LD according to the pulse width signal PWS and an amplitude modulation enable signal EPAM. The pulse width signal PWS is configured to control the length of time that the driving current ID is provided to the lighting component LD. In this embodiment, through the adjustment of the current value of the driving current ID by the driving current generator 110, and the adjustment of the pulse width of the pulse width signal PWS by the pulse width signal generator 120, the pixel circuit 100 may adjust the luminance of the lighting component LD. Moreover, through the adjustment of the control signal CTL by the voltage provider 130, the turn-on speed of the output switch SW1 may be accelerated. Therefore, the lighting component LD may generate sufficient and stable luminance even under low grayscale display conditions, which improves the uniformity of the overall display image.

Incidentally, in this embodiment, the lighting component LD may be a light emitting diode, and an anode thereof may be coupled to the current enabler 140 for receiving the driving current ID. A cathode of the lighting component LD is for receiving a reference ground voltage VSS.

Figure 2:
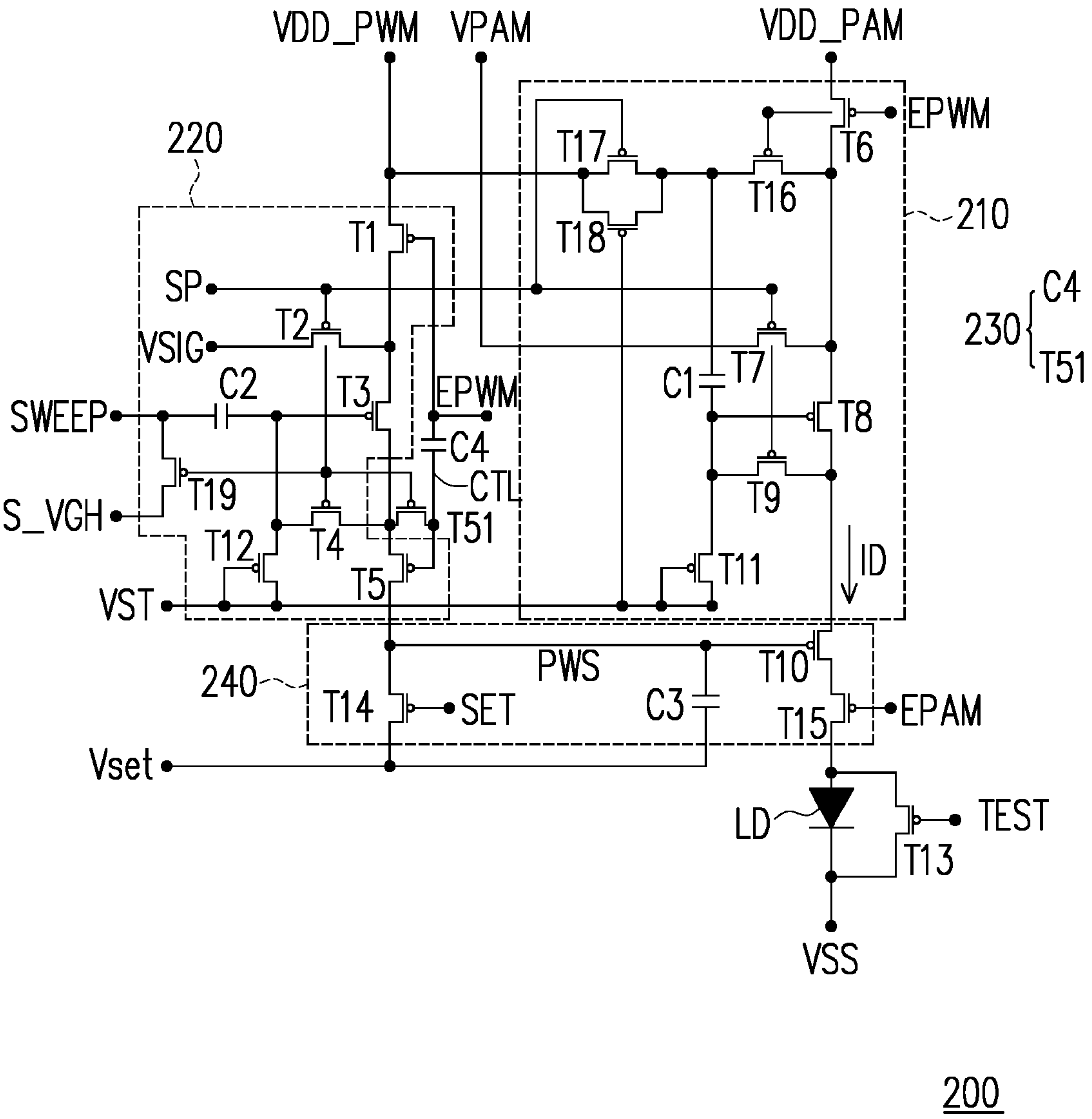
FIG. 2 is a schematic diagram of a pixel circuit according to another embodiment of the disclosure.

FIG. 2 is a schematic diagram of a pixel circuit according to another embodiment of the disclosure. Referring to FIG. 2, a pixel circuit 200 includes a driving current generator 210, a pulse width signal generator 220, a voltage provider 230, and a current enabler 240. The driving current generator 210 includes transistors T6~T9, T11, T16~T18, and a capacitor C1. A first end of the transistor T6 receives an operation voltage VDD_PAM, and a control end of the transistor T6 receives a pulse width modulation enable signal EPWM. A first end of the transistor T7 is coupled to a second end of the transistor T6. A second end of the transistor T7 receives write-in display data VPAM and a control end of the transistor T7 receives the data write-in signal SP. The transistor T8 is coupled in series between the transistor T6 and the current enabler 240. a first end of the transistor T9 is coupled to a first end of the transistor T8, a second end of the transistor T9 is coupled to a control end of the transistor T8, and a control end of the transistor T9 is coupled to the control end of the transistor T7. A first end of the transistor T11 is coupled to the second end of the transistor T9, and a control end and a second end of the transistor T11 jointly receive a reset signal VST. A first end of the transistor T16 is coupled to the second end of the transistor T6, and the control end of the transistor T16 receives the pulse width modulation enable signal EPWM. A first end of the transistor T17 is coupled to a second end of the transistor T16, a second end of the transistor T17 receives another operation voltage VDD_PWM, and a control end of the transistor T17 receives a data write-in signal SP. The transistor T18 is coupled in parallel with the transistor T17, and a control end of the transistor T18 receives the reset signal VST. Moreover, the capacitor C1 is coupled between the second end of the transistor T16 and the control end of the transistor T8.

The pulse width signal generator 220 includes transistors T1~T5, T12, T19, and a capacitor C2. Transistor T5 is configured to form an output switch. A first end of the transistor T1 receives an operation voltage VDD_PWM, and a control end of the transistor T1 receives the pulse width modulation enable signal EPWM. A first end of the transistor T2 receives write-in display data VSIG, a control end of the transistor T2 receives the data write-in signal SP, and a second end of the transistor T2 is coupled to a second end of the transistor T1. Transistor T3 is connected in series between the transistor T1 and the output switch (transistor T5). The transistor T4 is coupled between a second end of the transistor T3 and a control end of the transistor T3, and a control end of the transistor T4 receives the data write-in signal SP. A first end of the transistor T12 is coupled to the control end of the transistor T3, and a control end and a second end of the transistor T12 jointly receive a reset signal VST. A first end of the transistor T19 receives a sweeping signal SWEEP, a control end of the transistor T19 is coupled to the control end of the transistor T4, and a second end of the transistor T19 receives a reference voltage S_VGH. The capacitor C2 is coupled between the first end of the transistor T19 and the control end of the transistor T3.

It should be noted that in this embodiment, the voltage provider 230 includes a transistor T51 and a capacitor C4. A first end of the transistor T51 is coupled to the pulse width signal generator 220 for forming the first end of the transistor T5 of the output switch, a control end of the transistor T51 receives the data write-in signal SP, and a second end of the transistor T51 is coupled to a control end of the transistor T5. A first end of the capacitor C4 is coupled to the control end of the transistor T5, and a second end of the capacitor C4 receives the pulse width modulation enable signal EPWM.

In addition, the current enabler 240 includes transistors T10, T14, and T15, and a capacitor C3. A first end of the transistor T10 receives the driving current ID, and a control end of the transistor T10 receives the pulse width signal PWS. A first end of the transistor T14 is coupled to the control end of the transistor T10, a control end of the transistor T14 receives a set signal SET, and a second end of the transistor T14 receives a set voltage Vset. A transistor T15 is connected in series between a second end of the transistor T10 and the lighting component LD, and a control end of the transistor T15 receives the amplitude modulation enable signal EPAM. The capacitor C3 is coupled in parallel with the transistor T14.

Figure 3:
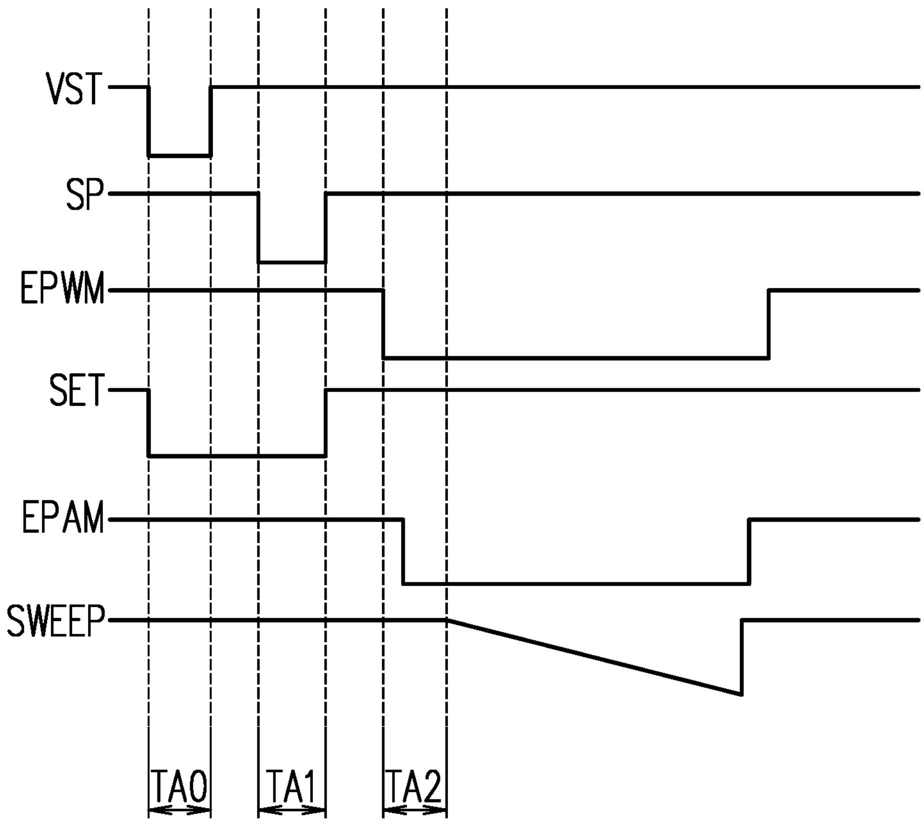
FIG. 3 is a motion waveform diagram of a pixel circuit according to an embodiment of the disclosure.

Operation details of the pixel circuit 200 may be referred to FIG. 2 and FIG. 3 simultaneously. FIG. 3 is a motion waveform diagram of a pixel circuit according to an embodiment of the disclosure. In a reset time interval TA0, the reset signal VST is pulled down to a logic low voltage, so that the driving current generator 210 and the pulse width signal generator 220 may execute a reset operation. During the reset operation, a voltage on the control end of the transistor T3 may be reset according to the reset signal VST (equal to the logic low voltage).

Then, in a time interval TA1, the data write-in signal SP is pulled down to a logic low voltage. At this time, the transistors T2, T4 and T51 may all be turned on. The write-in display data VSIG is written into the control end of the transistor T5, the first end of the transistor T51, and the control end of the transistor T3 through the turned-on transistors T2, T3, and T4. Taking the display data of which the write-in display data VSIG is a medium-high grayscale value as an example, the write-in display data VSIG may be 15V (volts), voltages on the control end of the transistor T5, the first end of the transistor T51, and the control end of the transistor T3 may be 13V due to the matrix effect of the transistor.

It is worth noting that in the time interval TA1, as the pulse width modulation enable signal EPWM is 15V, the pulse width modulation enable signal EPWM may charge the capacitor C4 and make a pitch between two ends of the capacitor C4 have a voltage difference of 2V.

At the same time, in the time interval TA1, the transistors T7 and T9 in the driving current generator 210 are turned on according to the data write-in signal SP. Another write-in display data VPAM corresponding to the driving current generator 210 is also written into the transistor T8. The driving current generator 210 may also generate the driving current ID according to the written write-in display data VPAM.

Then, in a time interval TA2, the pulse width modulation enable signal EPWM transitions, for example, from 15V to −5V, and pulls down the control signal CTL on the control end of the transistor T5 through the capacitor C4. For example, the voltage value of the control signal CTL is pulled down to −9V. In this way, the transistor T5 as the output switch is turned on quickly, and the pulse width signal PWS is provided to the control end of the transistor T10 immediately.

On the other hand, taking the display data of which the write-in display data VSIG is a low grayscale value as an example, the write-in display data VSIG may be 7V (volts). In the time interval TA1, as the data write-in signal SP is pulled down to a logic low voltage, voltages on the control end of the transistor T5, the first end of the transistor T51, and the control end of the transistor T3 may be 5V due to the matrix effect of the transistor.

It is worth noting that in the time interval TA1, as the pulse width modulation enable signal EPWM is 15V, the pulse width modulation enable signal EPWM may charge the capacitor C4 and make a pitch between two ends of the capacitor C4 have a voltage difference of 10V.

Then, in the time interval TA2, the pulse width modulation enable signal EPWM transitions, for example, from 15V to −5V, and pulls down the control signal CTL on the control end of the transistor T5 through the capacitor C4. For example, the voltage value of the control signal CTL is pulled down to −15V. In this way, the transistor T5 as the output switch is turned on quickly, and the pulse width signal PWS is provided to the control end of the transistor T10 immediately. That is, under low grayscale display conditions, the pixel circuit 200 may provide the driving current ID to the lighting component LD more immediately, and may maintain the correctness of the luminance of the lighting component LD.

Incidentally, in this embodiment, the pixel circuit 200 also includes a transistor T13 for forming a test switch. The transistor T13 is connected between two ends of the lighting component LD and controlled by a testing signal TEST. In response to the transistor T13 being turned on according to the testing signal TEST, the lighting component LD may be bypassed and not emit light. On the contrary, in response to the transistor T13 being cut off according to the testing signal TEST, the lighting component LD may work normally.

In addition, in the current enabler 240, the transistor T14 may be turned on according to the set signal SET, and the voltage on the control end of the transistor T10 is set as the set voltage Vset. Moreover, the transistors T10 and T15 are coupled in series. In response to the pulse width signal PWS and the amplitude modulation enable signal EPAM both being logic low voltage, the transistors T10 and T15 may be turned on and provide the driving current ID to the lighting component LD.

Figure 4:
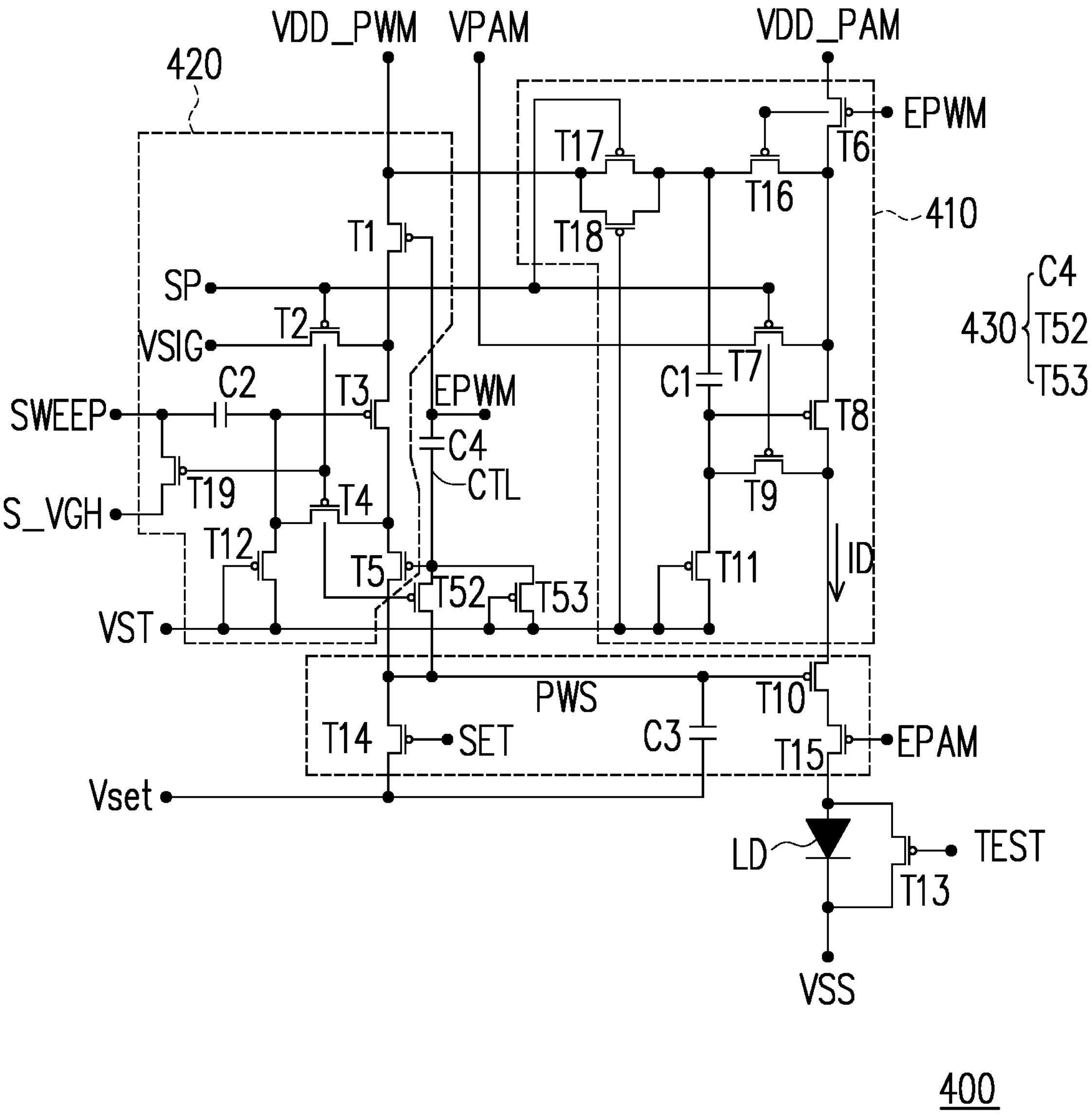
FIG. 4 is a schematic diagram of a pixel circuit according to another embodiment of the disclosure.

FIG. 4 is a schematic diagram of a pixel circuit according to another embodiment of the disclosure. Referring to FIG. 4, a pixel circuit 400 includes a driving current generator 410, a pulse width signal generator 420, a voltage provider 430, and a current enabler 440. In this embodiment, the driving current generator 410, the pulse width signal generator 420, and the current enabler 440 have the same circuit structure and operation method as the driving current generator 210, the pulse width signal generator 220, and the current enabler 240 of the embodiment of FIG. 2, respectively.

Different from the aforementioned embodiment, the voltage provider 430 in this embodiment includes the capacitor C4 and transistors T52 and T53. A first end of the transistor T52 is coupled to the second end of the transistor T5, a control end of the transistor T52 receives the data write-in signal SP, and a second end of the transistor T52 is coupled to the control end of the transistor T5. A first end of the capacitor C4 is coupled to the control end of the transistor T5, and a second end of the capacitor C4 receives the pulse width modulation enable signal EPWM. A first end and a control end of the transistor T53 receive the reset signal VST, and a second end of the transistor T53 is coupled to the control end of the transistor T5.

Figure 5:
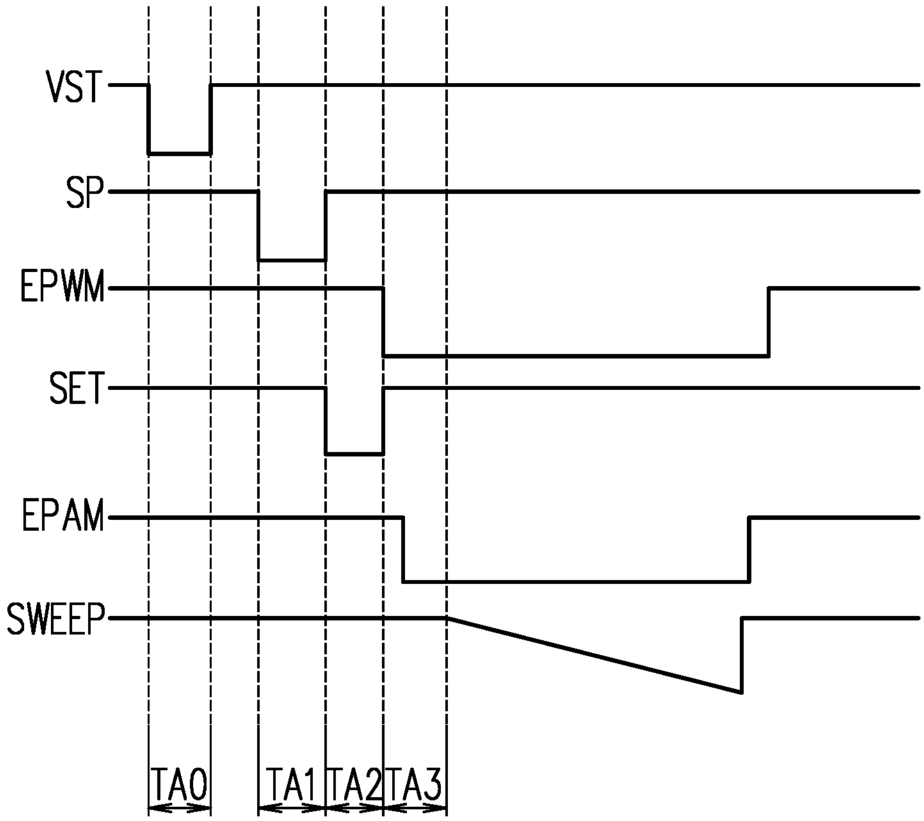
FIG. 5 is a motion waveform diagram of the pixel circuit according to the embodiment of FIG. 4.

Operation details of the pixel circuit 400 may be referred to FIG. 4 and FIG. 5 simultaneously. FIG. 5 is a motion waveform diagram of the pixel circuit according to the embodiment of FIG. 4. In a reset time interval TA0, the reset signal VST is pulled down to a logic low voltage, so that the driving current generator 210 and the pulse width signal generator 220 may execute a reset operation. During the reset operation, voltages on the control end of the transistors T3 and T5 may be reset according to the reset signal VST (equal to the logic low voltage).

Then, in the time interval TA1, the data write-in signal SP is pulled down to a logic low voltage. At this time, the transistors T2, T4 and T52 may all be turned on. The write-in display data VSIG and a threshold voltage of the transistor T5 are recorded in the control end of the transistor T5, and the change in threshold voltage of the transistor T5 may be compensated. Taking the display data of which the write-in display data VSIG is a medium-high grayscale value as an example, the write-in display data VSIG may be 15V, and the voltage of the first end of the transistor T5 may be 13V due to the matrix effect of the transistor. The voltage on the control end of the transistor T5 may be equal to 13V plus the threshold voltage of the transistor T5 (e.g., equal to −2V) to 11V.

In the time interval TA1, as the pulse width modulation enable signal EPWM is 15V, the pulse width modulation enable signal EPWM may charge the capacitor C4 and make a pitch between two ends of the capacitor C4 have a voltage difference of 4V.

At the same time, in the time interval TA1, the transistors T7 and T9 in the driving current generator 210 are turned on according to the data write-in signal SP. Another write-in display data VPAM corresponding to the driving current generator 410 is also written into the transistor T8. The driving current generator 410 may also generate the driving current ID according to the written write-in display data VPAM.

Then, in the time interval TA2, the set signal SET is pulled down to a logic low voltage, and the transistor T14 is turned on. Through the turned-on transistor T14, the pulse width signal PWS generated by the pulse width signal generator 420 may be equal to the set voltage Vset.

In a time interval TA3, the pulse width modulation enable signal EPWM transitions, for example, from 15V to −5V, and pulls down the control signal CTL on the control end of the transistor T5 through the capacitor C4. For example, the voltage value of the control signal CTL is pulled down to −9V. In this way, the transistor T5 as the output switch is turned on quickly, and the pulse width signal PWS is provided to the control end of the transistor T10 immediately.

On the other hand, taking the display data of which the write-in display data VSIG is a low grayscale value as an example, the write-in display data VSIG may be 7V, and the voltage of the first end of the transistor T5 may be 5V due to the matrix effect of the transistor. The voltage on the control end of the transistor T5 may be equal to 5V plus the threshold voltage of the transistor T5 (e.g., equal to −2V) to 3V.

It is worth noting that in the time interval TA1, as the pulse width modulation enable signal EPWM is 15V, the pulse width modulation enable signal EPWM may charge the capacitor C4 and make a pitch between two ends of the capacitor C4 have a voltage difference of 12V.

Then, in the time interval TA2, the pulse width modulation enable signal EPWM transitions, for example, from 15V to −5V, and pulls down the control signal CTL on the control end of the transistor T5 through the capacitor C4. For example, the voltage value of the control signal CTL is pulled down to −17V. In this way, the transistor T5 as the output switch is turned on quickly, and the pulse width signal PWS is provided to the control end of the transistor T10 immediately. That is, under low grayscale display conditions, the pixel circuit 400 may provide the driving current ID to the lighting component LD more immediately, and may maintain the correctness of the luminance of the lighting component LD.

Certainly, the voltage value of the write-in display data VSIG, the high and low voltage values of the pulse width modulation enable signal EPWM, and the threshold voltage values of the transistors in the above-mentioned embodiments of FIG. 2 to FIG. 5 are just examples for illustration. Designers may design the above-mentioned related voltage according to the actual application conditions of the pixel circuit and the electrical characteristics of the circuit component, where there are no special restrictions.

Figure 6:
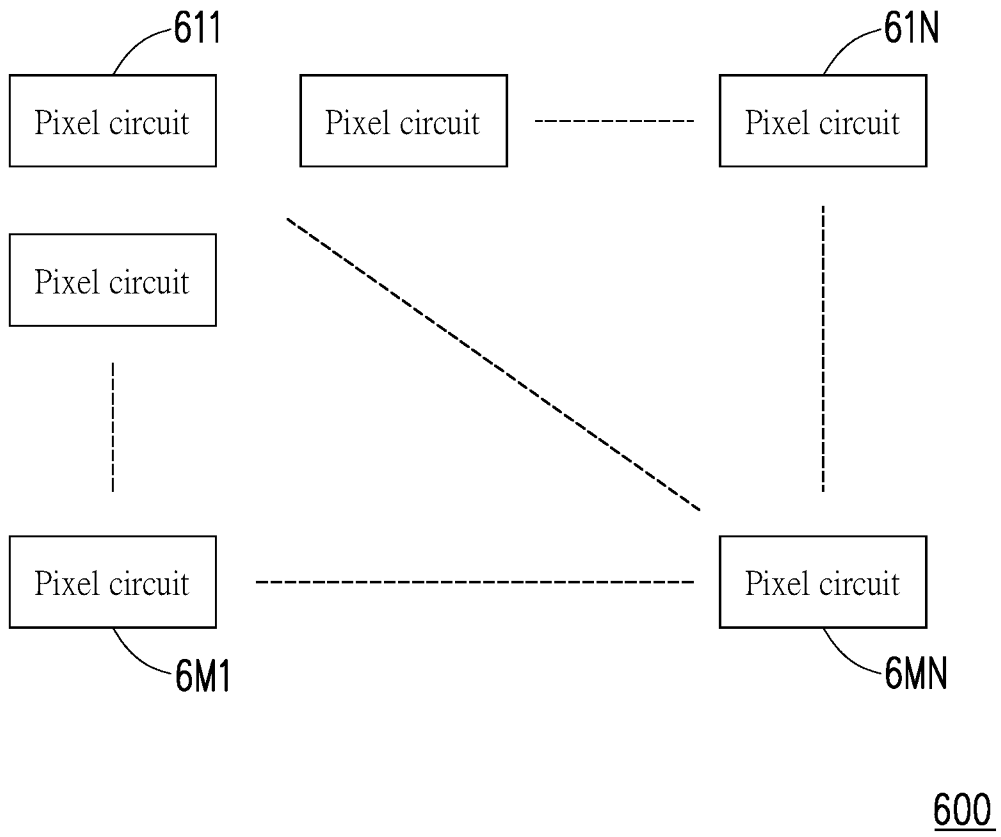
FIG. 6 is a schematic diagram of a display panel according to an embodiment of the disclosure.

FIG. 6 is a schematic diagram of a display panel according to an embodiment of the disclosure. Referring to FIG. 6, the display panel 600 includes multiple pixel circuits 611~6MN. The pixel circuits 611~6MN may be arranged into an array. Each of the pixel circuits 611~6MN may be implemented by using any one of the pixel circuits 100, 200, and 400 in the aforementioned embodiment. The implementation details of the pixel circuits 100, 200, and 400 have been described in detail in the aforementioned multiple embodiments, and are not to be repeated herein.

To sum up, the pixel circuit of the disclosure adjusts the voltage value of the control signal controlling the output switch in the pulse width signal generator through the voltage provider to increase the turn-on speed of the output switch. In this way, no matter in high, medium, or low grayscale display conditions, the pixel circuit may immediately provide a driving current to light up the lighting component. Correct luminance of the pixel component is effectively ensured and the uniformity of the image of the display panel is improved.

What is claimed is:

1. A pixel circuit, comprising:

a driving current generator, providing a driving current;

a pulse width signal generator comprising an output switch, wherein the output switch is controlled by a control signal, and providing a pulse width signal according to the control signal;

a voltage provider, coupled to a control end of the output switch and adjusting the control signal according to a data write-in signal and a pulse width modulation enable signal; and a current enabler, coupled to the driving current generator and the pulse width signal generator and providing the driving current to a lighting component according to the pulse width signal and an amplitude modulation enable signal.

2. The pixel circuit according to claim 1, wherein the output switch is a first transistor, a first end of the first transistor receives first write-in display data, a second end of the first transistor generates the pulse width signal, and a control end of the first transistor receives the control signal.

3. The pixel circuit according to claim 2, wherein the voltage provider comprises:

a second transistor comprising a first end coupled to the first end of the first transistor, wherein a control end of the second transistor receives the data write-in signal, and a second end of the second transistor is coupled to the control end of the first transistor; and a capacitor comprising a first end coupled to the control end of the first transistor, wherein a second end of the capacitor receives the pulse width modulation enable signal.

4. The pixel circuit according to claim 3, wherein at a first time interval, the second transistor is turned on according to the data write-in signal to transmit the first write-in display data to the control end of the first transistor, at a second time interval, the pulse width modulation enable signal transitions and pulls down the control signal on the control end of the first transistor, and the first time interval is before the second time interval.

5. The pixel circuit according to claim 2, wherein the voltage provider comprises:

a second transistor comprising a first end coupled to the second end of the first transistor, wherein a control end of the second transistor receives the data write-in signal, and a second end of the second transistor is coupled to the control end of the first transistor;

a capacitor comprising a first end coupled to the control end of the first transistor, wherein a second end of the capacitor receives the pulse width modulation enable signal; and a third transistor comprising a first end and a control end configured to receive a reset signal, wherein a second end of the third transistor is coupled to the control end of the first transistor.

6. The pixel circuit according to claim 5, wherein at a first time interval, the third transistor is turned on, and a voltage on the control end of the first transistor is reset; at a second time interval after the first time interval, the second transistor is turned on, so that the first write-in display data and a threshold voltage of the first transistor are recorded in the control end of the first transistor; and at a third time interval after the second time interval, the pulse width modulation enable signal transitions and pulls down the control signal on the control end of the first transistor.

7. The pixel circuit according to claim 6, wherein the second time interval and the third time interval further comprise a fourth time interval, and in the fourth time interval, the current enabler makes the pulse width signal equal to a set voltage.

8. The pixel circuit according to claim 1, wherein the driving current generator is configured to adjust a size of the driving current provided to the lighting component, and the pulse width signal generator is configured to adjust a time to provide the driving current to the lighting component.

9. The pixel circuit according to claim 1, wherein the driving current generator comprises:

a first transistor comprising a first end for receiving a first operation voltage, wherein a control end of the first transistor receives the pulse width modulation enable signal;

a second transistor comprising a first end coupled to a second end of the first transistor, wherein a second end of the second transistor receives second write-in display data, and a control end of the second transistor receives the data write-in signal;

a third transistor coupled in series between the first transistor and the current enabler;

a fourth transistor comprising a first end coupled to a first end of the third transistor, wherein a second end of the fourth transistor is coupled to a control end of the third transistor, and a control end of the fourth transistor is coupled to the control end of the second transistor;

a fifth transistor comprising a first end coupled to the second end of the fourth transistor, wherein a control end and a second end of the fifth transistor jointly receive a reset signal;

a sixth transistor comprising a first end coupled to the second end of the first transistor, wherein a control end of the sixth transistor receives the pulse width modulation enable signal;

a seventh transistor comprising a first end coupled to a second end of the sixth transistor, wherein a second end of the seventh transistor receives a second operation voltage, and a control end of the seventh transistor receives the data write-in signal;

an eighth transistor coupled in parallel with the seventh transistor, wherein a control end of the eighth transistor receives the reset signal; and a capacitor, coupled between the second end of the sixth transistor and the control end of the third transistor.

10. The pixel circuit according to claim 1, wherein the pulse width signal generator comprises:

a first transistor comprising a first end for receiving an operation voltage, wherein a control end of the first transistor receives the pulse width modulation enable signal;

a second transistor comprising a first end for receiving write-in display data, wherein a control end of the second transistor receives the data write-in signal, and a second end of the second transistor is coupled to a second end of the first transistor;

a third transistor connected in series between the first transistor and the output switch;

a fourth transistor, coupled between a second end of the third transistor and a control end of the third transistor, wherein a control end of the fourth transistor receives the data write-in signal;

a fifth transistor comprising a first end coupled to the control end of the third transistor, wherein a control end and a second end of the fifth transistor jointly receive a reset signal;

a sixth transistor comprising a first end receiving a sweeping signal, wherein a control end of the sixth transistor is coupled to the control end of the fourth transistor, and a second end of the sixth transistor receives a reference voltage; and a capacitor, coupled between a first end of the sixth transistor and the control end of the third transistor.

11. The pixel circuit according to claim 1, wherein the current enabler comprises:

a first transistor comprising a first end for receiving the driving current, wherein a control end of the first transistor receives the pulse width signal;

a second transistor comprising a first end coupled to the control end of the first transistor, wherein a control end of the second transistor receives a set signal, and a second end of the second transistor receives a set voltage;

a third transistor connected in series between a second end of the first transistor and the lighting component, wherein a control end of the third transistor receives the amplitude modulation enable signal; and a capacitor coupled in parallel with the second transistor.

12. The pixel circuit according to claim 1, further comprising:

a test switch disposed at two ends of the lighting component and controlled by a testing signal.

13. A display panel, comprising a plurality of pixel circuits according to claim 1, wherein the pixel circuits are arranged into a display array.

* * * * *